Sept. 13, 1966          L. MEYERHOFF          3,271,958
HYDRAULIC TORQUE CONVERSION APPARATUS
Original Filed Feb. 25, 1960          5 Sheets-Sheet 1
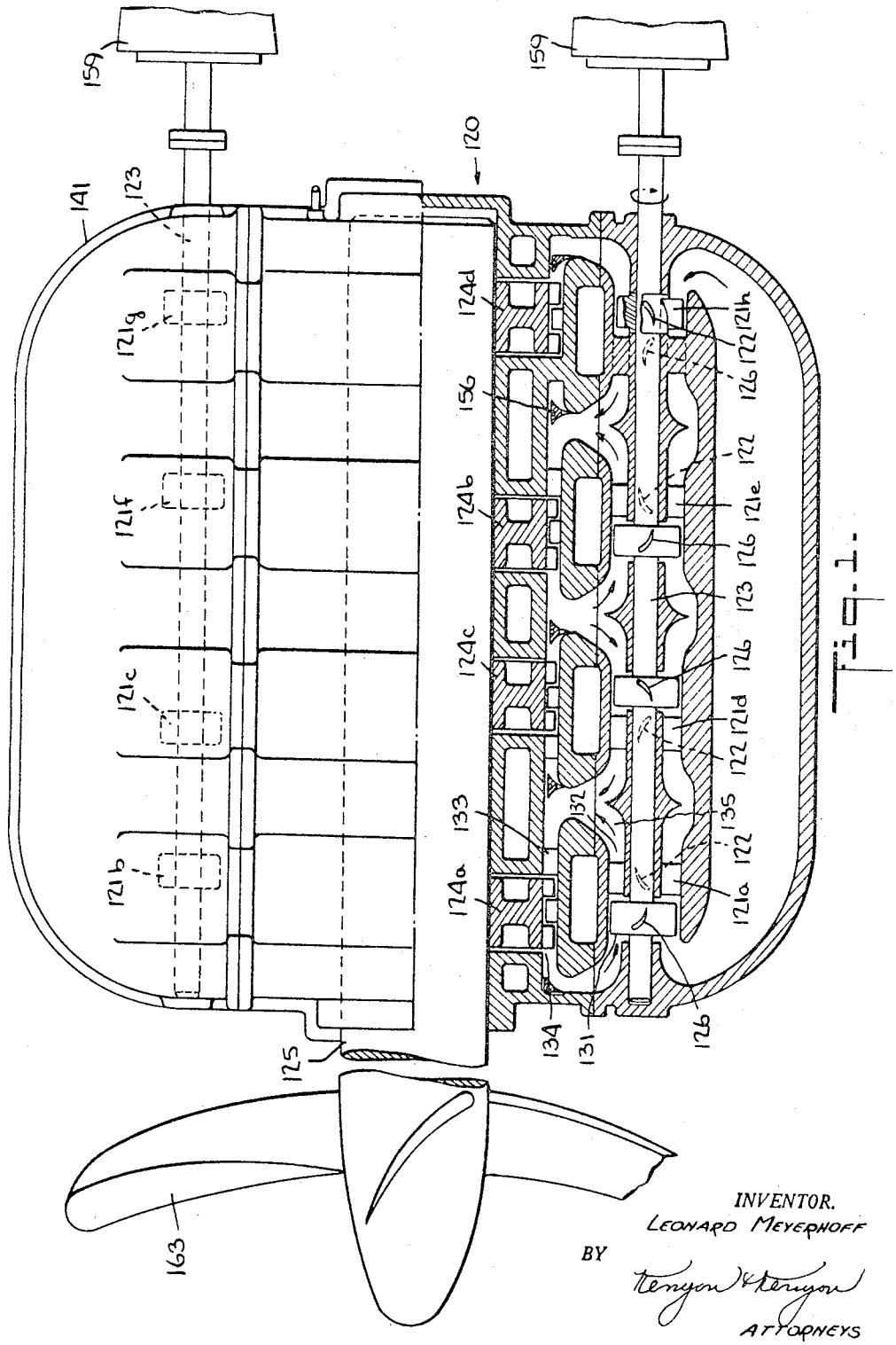
INVENTOR.
LEONARD MEYERHOFF
BY
Kenyon & Kenyon
ATTORNEYS

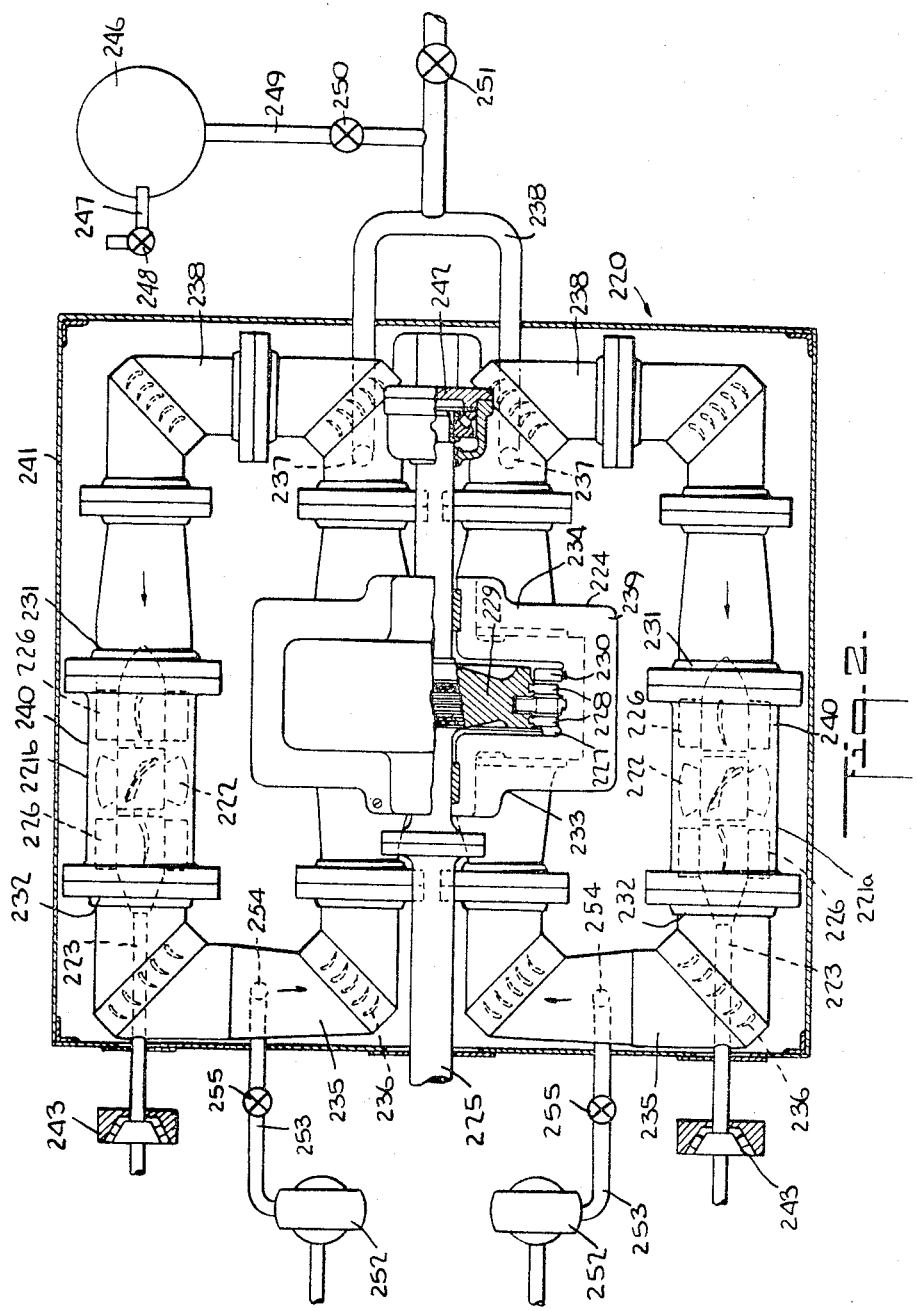

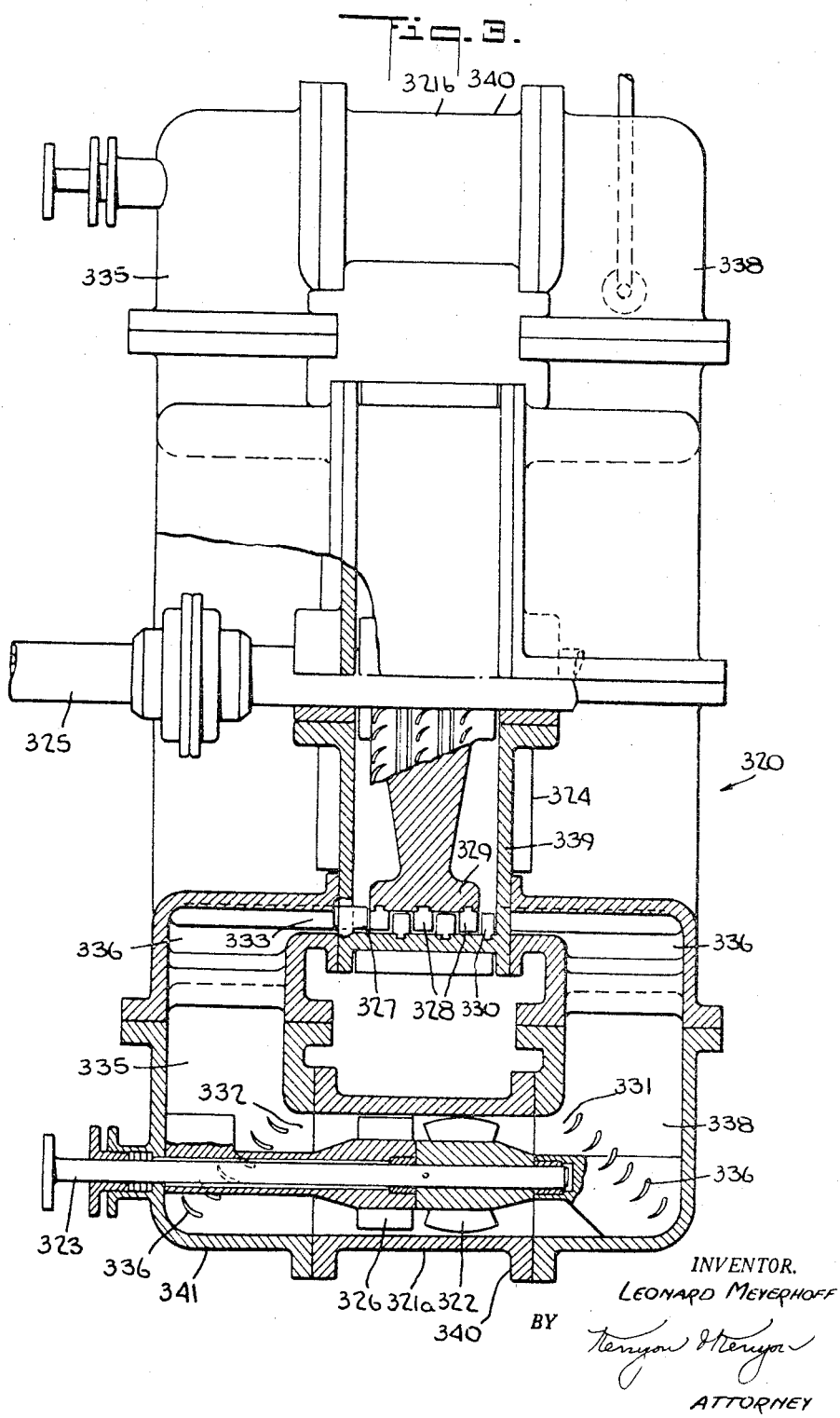

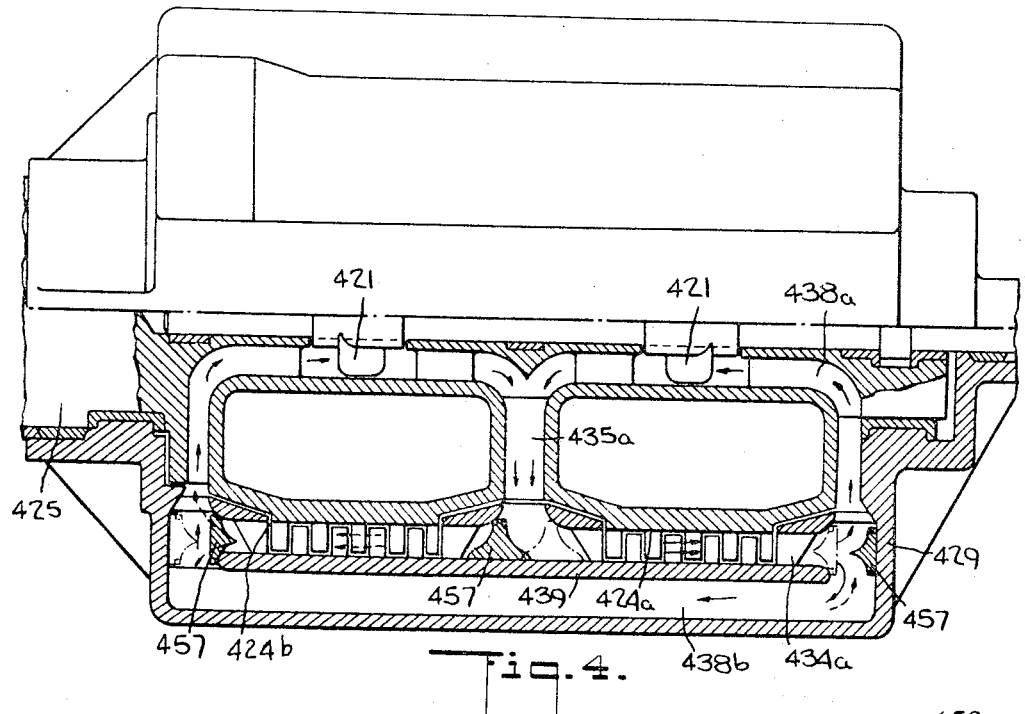
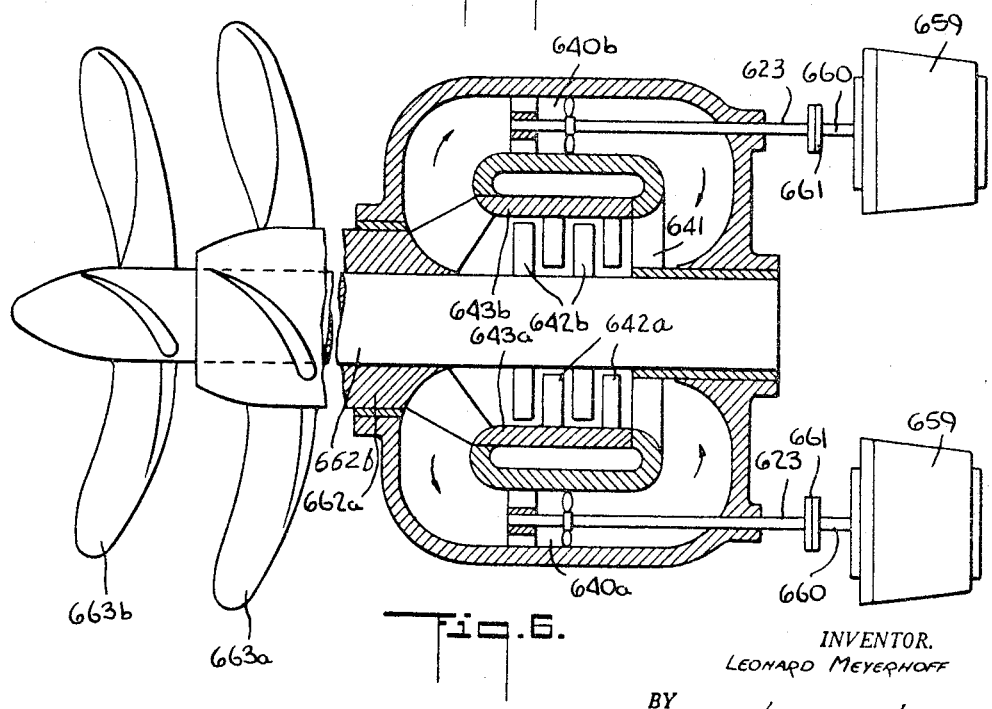

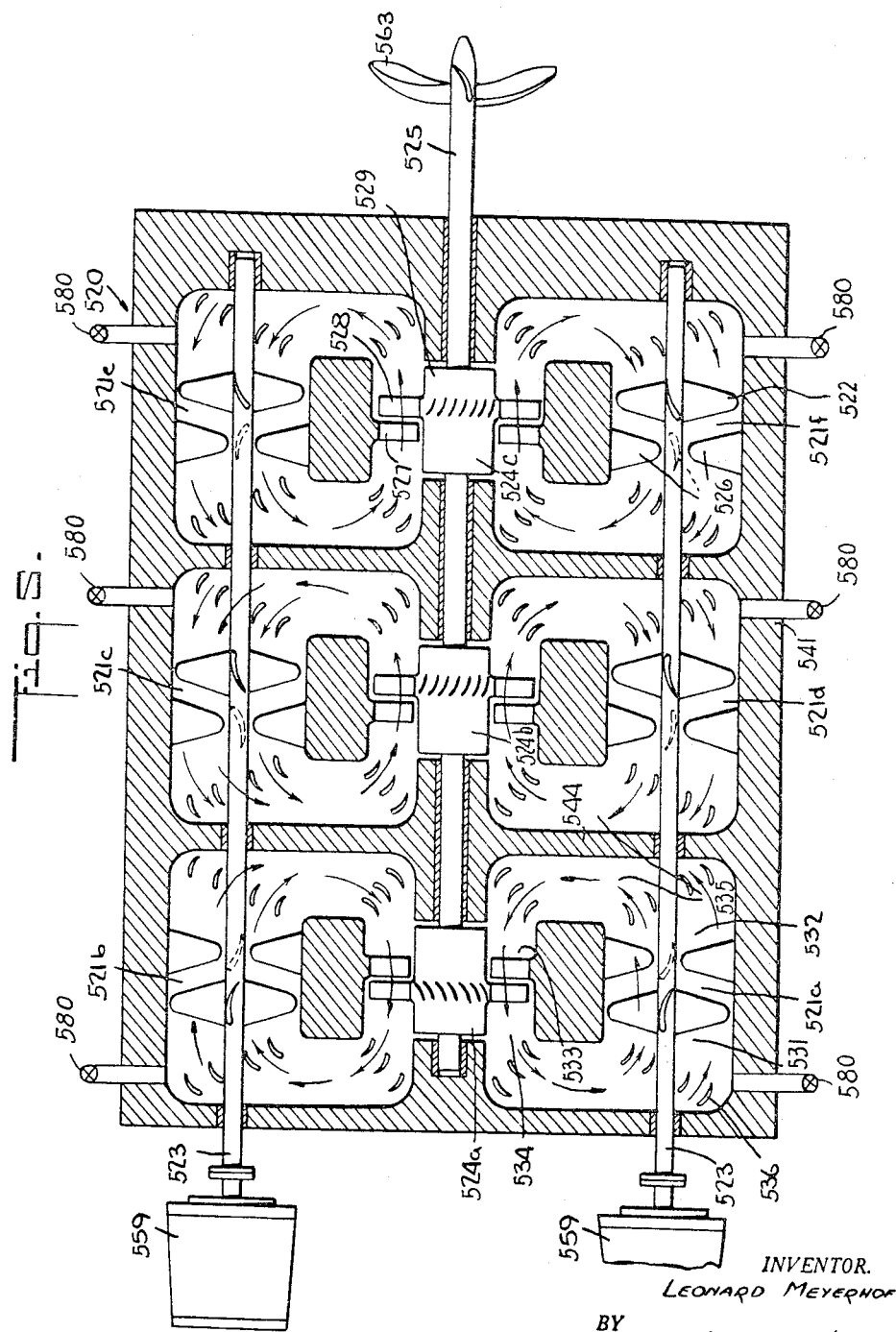

United States Patent Office 3,271,958
Patented Sept. 13, 1966

3,271,958
HYDRAULIC TORQUE CONVERSION
APPARATUS
Leonard Meyerhoff, Brooklyn, N.Y., assignor to Eastern
Research Group, a partnership
Original application Feb. 25, 1960, Ser. No. 11,057.
Divided and this application Apr. 6, 1964, Ser. No.
357,730
7 Claims. (Cl. 60—54)

This application is a division of U.S. application Serial No. 11,057, filed February 25, 1960.

This invention relates to hydraulic transmission systems and apparatus of the hydrodynamic type. More particularly, the invention relates to such systems and apparatus used for effecting speed reduction during the transmission of mechanical power from a drive member, such as the rotating shaft of an engine, to a driven member, such as a power take-off shaft. The principal apparatus of a hydraulic transmission system intended for such purpose, and that with which this invention is primarily concerned, is more commonly known as a torque converter.

The embodiments of the invention to be described were developed during the course of a study relating to speed reduction systems and apparatus for use in ships as part of the main propulsion machinery and, therefore, the invention will be described in connection with such use. However, it will be understood that the range of application of the invention includes mechanical power transmission use in other fields such as railroad, stationary power generating machinery and perhaps automative and airplane locomotion.

In all of such fields of application, the invention is especially useful in transmitting very high power from an extremely high speed shaft to another shaft where the speed reduction ratio between the shafts is intended to be relatively high. These requirements must be met when designing marine propulsion systems and machinery where power from a relatively high speed engine must be transmitted to rotate the ship's propeller at relatively low speed. High speed, high efficiency engines are now available. For example, a modern steam turbine for use as a main propulsion engine in a ship may develop tens of thousands of shaft horsepower (S.H.P.) at a speed of from 4000–6000 revolutions per minute (r.p.m.), and this relatively high horsepower must be efficiently transmitted to a propeller shaft intended to rotate at about 125–200 r.p.m. To do this, speed reduction apparatus must be selected which is adaptable both to the requirements of the speed reduction system and to overall design considerations affecting the ship.

The use of a hydraulic transmission system in ships as the primary means to effect speed reduction is known. Such has not been widely adopted, however, largely for the reason that it has been thought the system is relatively inefficient in high power, high speed reduction ratio applications, that is ratios greater than 20 to 1, because of proportionately increased fluid heads, losses incurred to attain high pressures, line losses and other problematical considerations which compel delicate design of apparatus which also becomes proportionately large and relatively inefficient.

Accordingly, it is an object of the present invention to provide an efficient speed reduction system and apparatus which will be relatively compact in size and weight for the amount of power transmitted and the speed reduction ratio requirements of the system. The system should have the additional advantages of being comparatively noiseless in operation and capable of absorbing operational shock, and should be economical to install and maintain. These objects are especially intended to be achieved in applications where very high horsepower must be transmitted accompanied by substantial torque conversion, or speed reduction.

A further and distinct object of the invention is to provide a hydraulic torque converter and a system incorporating such apparatus for use in ships, such as surface vessels and submarines, as a primary means for transmitting main propulion engine power to a propeller of the ship. It is intended that the invention be generally compatible with all types of engines.

Generally, these objects are achieved by providing a comparatively high volume output (i.e. high mass flow rate) type fluid pump, such as an axial flow blade type pump, whose impeller shaft is driven by, for example, the main propulsion engine of a ship such as a steam turbine, the pumped fluid driving a turbine having reaction type blading, which constitutes, in effect, a hydraulic motor. In turn, the hydraulic turbine drives the ship's propeller shaft and consequently its propeller. The apparatus and system is arranged and constructed to provide torque multiplication during the transmission of power, and attending speed reduction.

It may be said that the approach of the invention has been to provide means which cause a high volume of transmission fluid to flow under only moderate pressure head between the pump and turbine of the torque converter as compared with other hydraulic systems for a similar purpose. One of the means of the invention which achieves the high volume fluid flow is orientation of the pump's outlet opening and hydraulic turbine inlet opening in relatively spaced apart relationship to each other as compared with other integrated apparatus of the kind. It is believed that among other things, this provides proper operating conditions for the pump itself as well as permitting an arrangement of the apparatus to provide the same for the turbine. Thus, de-emphasis of fluid flow head, and emphasis of flow volume in the design brings about reduction in losses, promotes reduction in the overall size of the equipment, and actually permits the hydraulic motor to be located a considerable distance from the pump.

Further generally describing the invention, when transmission fluid supply to the turbine is to be increased, additional pumps serving the same turbine are provided, and these are arranged so that their respective fluid outputs flow in parallel relationship to each other as compared with staged, or series flow relationship. The present invention provides a plurality of axial flow blade type single stage pumps on either a common impeller shaft, or more than one shaft, depending upon preference in a given application. Further, it will be seen that the present inventive construction permits full, 360 degree perimeter inlet of the pumped fluid into the turbine. Duct means which provide passageways for the fluid between the pump outlets and the turbine inlet, are rather long as compared with prior art constructions. Stationary fluid guide vanes are preferably located within the passageways usually near bends in the ducts. The ducts may extend from the turbine outlet back to the inlets of the pumps to provide a closed, fluid recirculating arrangement. Water may be used as the transmission fluid, and to prevent blade cavitation losses at high pump speeds, the water may be maintained under considerable static pressure.

Further, while multiple staged turbines are well-known, it has been discovered that the speed reduction ratio, or amount of torque conversion provided by the apparatus of the present invention can be fixed and determined without regard to engine drive or pump speed simply by providing one or more turbine stages. Of course, relative diameters of the pumps and turbine also may be changed to achieve some similar effects, within size limitations.

In addition it has been found that the power transmission capability of the apparatus can be multiplied by arranging the turbines of the apparatus, where more than one is used, in parallel relationship with each other. In the present invention, this is provided by partitioning of the transmission fluid duct, means to cause separate circulation of a portion of the fluid to each turbine, thereby providing pump-turbine "cartridges," as will be shown.

The invention also provides an efficient speed reduction system for use together with main propulsion machinery in a ship, as will become apparent. The system includes a propeller reversing stage, and a ring valve arrangement in the turbines of the apparatus to provide reversing means which are independent of the direction of rotation of the main engine shaft, and that of the fluid pumps of the system.

These and other objects and features of the invention will be more fully understood from the following description thereof when taken with reference to the accompanying drawings in which:

FIGURE 1 is a sectionalized view of a form of torque converter for use in a speed reduction system of a ship;

FIGURE 2 is a schematic representation of torque converter apparatus embodying the invention to show the principal components and arrangement thereof;

FIGURE 3 is a schematic representation showing a modified form of arrangement of the principal components;

FIGURE 4 is a schematic representation similar to FIGURE 2 to show another modified form of arrangement;

FIGURE 5 is a schematic representation similar to FIGURE 2 to show another modified form of arrangement of the principal components;

FIGURE 6 is a schematic representation of still another modified arrangement of the invention.

In the specification and drawings, corresponding elements have the same unit and tens digits in the reference numerals. Where the specification refers to a corresponding element in a plurality of figures, only the units and tens digits portion of the reference numeral is given. The hundreds digit in the reference numerals serve as a prefix which corresponds to the figure number of a drawing in which a particular embodiment of an element is found.

Referring to FIGURES 1–5, torque converter apparatus 20 of the invention has one or more high volume output type pumps 21a–h, each having an impeller 22 mounted on an impeller shaft 23. Impeller shafts 23 are connected to a drive member to be rotated thereby. The pumps are intended to supply a comparatively high volume of transmission fluid to turbines 24a–d causing their rotation and consequent rotation of the power output or take-off shaft 25 of the apparatus, upon which the turbines 24 are mounted.

While the objects of the invention might be achieved by using any high volume type pump capable of being coupled to a high speed drive member, either known or yet to be developed, it has been found that an axial flow blade type pump having a constant internal cross section is excellent for the purpose. Thus, in all of the embodiments shown, the pump impeller 22 consists of a row of moving blades which, for purposes of the present description are also designated by the numeral 22. A plurality of blades will be used on the impeller. Further, each pump 21 has but one stage, comprising the impeller 22 with or without one or more rows of stationary blades 26 which may be located upstream or downstream as a matter of design preference. These blades 26 may be disposed upstream of the impeller and oriented to produce a pre-whirl in the fluid to rotate the fluid entering the pump in the same direction as the pump impeller rotation to reduce excessively high relative and absolute velocities in the system which may become excessively high by vitrue of imposed design conditions. In any event, where reference herein is made to a pump 21 of the apparatus or system, it will be understood that a single stage pump is meant, its stage including the stationary blading when adopted.

Similarly, turbine 24 may have one or more stages, determined as will be later described. Usually, the fluid is introduced into the turbine 24, which is preferably of the axial flow type, by causing it to flow through a row of stationary blades 27, disposed at the inlet side of the turbine and commonly referred to as a nozzle, from whence it flows through a row of moving blades 28 mounted in the turbine wheel or drum 29 to impart rotative movement thereto, and thereafter through another row of stationary blades 30 at the outlet side of the row of moving blades. In any event, where reference herein is made to a single turbine "stage," a single row of moving blades is referred to, whether or not a row of stationary blading is associated therewith.

For reference purposes, each pump 21 may be said to have a fluid inlet opening 31 and a fluid outlet opening 32, usually formed by the surrounding casing, defined by the planes of the outer edges of the outermost pump blading at those respective sides, or ends of the pump, which are perpendicular to the line of fluid flow. In like manner, and for reference purposes, a turbine 24 may be said to have a fluid inlet opening 33 and a fluid outlet opening 34 defined by the surrounding structure and the plane perpendicular to the line of fluid flow at the outer edge of the outermost blading of the turbine at its inlet and outlet sides, respectively. Preferably, the fluid passageway between the inlet opening 33 and outlet opening 34 of the turbine 24 has a constant cross-section.

Enclosed duct means 35 provide a passageway for the flow of fluid from the outlet opening 32 of the pump 21 to the inlet opening 33 of the turbine 24. Thus, these fluid openings of the pump and turbine are in spaced apart relationship to each other, as compared with usual torque converter apparatus where these openings are intended to be as close to each other as possible to minimize line losses, and perhaps for other reasons. By the present invention, therefore, space is provided between the primary components in which a fluid flow pattern may be established to promote the efficient operation of both. Careful design of the duct means 35 will directionalize, and create favorable conditions of fluid flow at the pump outlet and turbine inlet, thereby minimizing losses in both of the units. Line losses within the duct means 35 itself can be minimized by careful design thereof, which may provide inclusion of stationary fluid guide blades 36 within the passageway at bends in the duct and at other locations in the line of flow. At duct bend locations, stationary blades 36 promote cascade flow of the fluid therearound. However, these guide blades may be omitted altogether.

The transmission fluid of the system is introduced through suitable ports in the apparatus. Any of the many known types of transmission fluid may be used, but a feature of the speed reduction system of this invention is that water may be used for the purpose. Where the apparatus is used aboard ships, in times of emergency this feature may have considerable importance because of the ready availability of replenishment supply. The transmission fluid interconnects the pumps 21 with the turbine 24 of the apparatus so that when the pumps are driven by the drive member, the fluid is forced by the pumps through the turbine to cause its rotation. Since the rotating turbine wheel 29 is fixed on the power output shaft 25 of the apparatus, the latter also rotates in response to pumping of the fluid, whereby the power imparted to impeller shaft 23 by a drive member (not shown in FIGURES 2–3) is transmitted to the output shaft 25. In the embodiments shown, speed reduction rather than increase is intended, but the opposite might be caused to occur by altering the relative sizes of the components.

In elemental form, the apparatus of the invention might only require one pump 21 serving one turbine 24, and the latter may have but a single stage. However, more than one pump may be used to provide greater volume of fluid to the turbine, increasing the amount of power transmitted and increase the r.p.m. reduction ratio. As shown in FIGURES 1–3 and 5, where a plurality of pumps are employed to serve a single turbine, the fluid outlet opening 32 of each pump is arranged in parallel relationship with that of every other pump to effect parallel relationship between the flows of fluid outputs from all the pumps. This effects substantial increase in flow volume of all the fluid from the pumps which serve the same turbine, while only moderately increasing the flow head of pressure of that fluid. Thus, rather than by adding multiple pump stages which, in effect, amounts to adding pumps to the sytem in series, the flow volume of the system is increased by adding single stage pumps in parallel relationship with respect to the flow from all of them. For example, as shown in FIGURE 1, the output fluid flow from pump 121a is in parallel relationship with that from any of the other pumps. In FIGURES 2 and 3, the flow from the pump 21a to turbine 24 in each arrangement is parallel to the flow from the pump 21b. Referring to FIGURE 5, this relationship is also true with respect to the flows from pumps 521c and 521d to turbine 524b, and from pumps 521e and 521f to turbine 524c. It is seen, therefore, that spacing apart of all of the pump outlet openings 32 from the turbine inlet opening 33 provides space for the efficient arrangement of a plurality of pumps 21, and for inclusion of duct means 35, to cause parallel fluid flow. In this respect, it is to be noted that the impellers 22 themselves or, alternatively speaking, the pumps 21 themselves, may be in series arrangement, as shown by FIGURE 1 and by FIGURE 5 wherein several pump impellers 22 are mounted on a common shaft 23, yet the fluid outflows from all of them may have parallel relationship. Certain pumps, for example, pumps 21a and 21b in FIGURES 2 and 3, are themselves in parallel relationship. It may be said, therefore, that regardless of whether the pumps 21 themselves are arranged in series or parallel with each other, so long as the fluid outlet openings 32 of all of the pumps 21 in a given apparatus are arranged in parallel relationship with respect to the fluid outputs of each of them, the objects of the invention may be achieved.

Referring to several of the many variations in arrangement of the pump and turbine components of the apparatus which are possible according to its intended use, FIGURE 1, shows a plurality of pumps 121 each of which is driven by a single drive member 159.

FIGURES 2 and 3 show a form of the invention, the apparatus being of "built up" construction including duct means 38 between outlet opening 34 of the turbine 24 and inlet openings 31 of the pumps 21 which, together with duct means 35, provides an enclosed, recirculating passageway for the transmission fluid. The turbine 24 is enclosed in its own casing 39, as are the pumps 21 in their respective casings 40. All of the apparatus is encased in a transmission housing 41. In this embodiment, two single stage, axial flow, blade type pumps serve a two-stage turbine 24 which has a nozzle block 27 at its entrance.

As shown in FIGURE 2, appropriate axial thrust bearings 242 and 243 are provided on the power take-off shaft 225 and the power input or pump impeller shafts 223, respectively. This arrangement, as shown, transmits the power from two engine prime movers (not shown) to a single power take-off shaft 225 by coupling each engine to one of the impeller shafts 223. Alternatively, a single engine might be appropriately geared, or otherwise coupled to both impeller shafts 223 for transmission of its power to the shaft 225.

FIGURE 2 also shows means whereby the apparatus may be adapted for use in a speed reduction system where extremely high blade velocities and power transmission is involved. Transmission fluid, such as water, is supplied through the ports 237 at duct means 238 by a pneumatic tank arrangement, as is well known for the purpose. Pneumatic tank 246 has a fluid supply line 247, with a suitable valve 248 therein, and a fluid outlet line 249, also with a valve 250 therein, the latter connected to ports 237, as shown. The fluid recirculating passages are filled completely. A back pressure relief valve 251 is provided. Where high blade speeds are involved, blade cavitation may be great. Therefore, to prevent loss of efficiency, it is preferable to provide means for placing the fluid under, and maintaining considerable static pressure during operation of the system. Such means are provided, for example, by fluid pressurizing and fluid replenishment pumps 252 which apply static pressure of, say, 200–300 p.s.i. continuously during operation to the fluid of the system. This pressure is furnished through pressure lines 253 leading to pressure ports 254 in duct means 235. Pressure lines 254 have suitable valves 255 therein. Such static pressure will reduce or eliminate blade cavitation, thereby increasing the efficiency of the pumps and of the system.

It should be appreciated that each of the embodiments may have such a pressurizing system and in case of failure thereof it should also be realized that each embodiment may be provided with a valved duct which extends between the recirculating passages and the exterior of the vessel 30 so that in submarine use this duct may be opened at 200–300 feet below the surface to provide such static pressure and permit full power utilization without cavitation. It is also possible to operate a pressurized system, even though the pressurizing apparatus is rendered inoperative, on the surface efficiently absorbing approximately 50% of the maximum prime mover power.

FIG. 4 is intended to show how a plurality of pumps 241 on the same impeller shaft 423, might be arranged interiorly of the turbine wheel, or drum 429. Of course, the pump impeller shaft 423 is driven by a drive member or engine (not shown) as in the other embodiments, and the turbine is connected to the power take-off shaft 425, as in other embodiments. In this embodiment the fluid flow from both pumps 421 is directed, as indicated by the arrows, to serve one turbine 424a with the fluid flowing from both pumps 421 through passageway 435a and then splitting adjacent the turbine outlet opening 434a so that half of the fluid returns to the inlet end of one pump through interior passageway 438a and the other half of the fluid returns to the inlet end of the other pump through passageway 438b which is outside the converter casing. This embodiment provides means for reversing the direction of rotation of the driven shaft 425 without reversing the direction of rotation of the pumps 421. This means is comprised of ring valves 457 which are adapted to slide to the dotted line positions shown to thus direct the fluid flow from both pumps to serve turbine 424b in a like manner, as indicated by the dotted arrows. The movable blades of turbine 424b are so oriented that the direction of rotation of the driven shaft 425 will be reversed when the fluid flows therethrough in the direction indicated by the dotted arrows.

FIGURE 5 shows how several pump-turbine combinations might be "stacked," or arranged "cartridge-fashion," to drive a single power take-off shaft 525, yet each parallel pair of pumps together with its associated turbine may recirculate its own separate portion of all of the transmission fluid of the system. This is accomplished by appropriate placement as shown by FIGURE 5 of fluid partition means 544 between the duct means 535. Compare FIGURE 1 with respect to the flow from pumps 121a and 121d, for example. If desirable, for the purpose to be described, fluid drain ports 80 may be provided in each of the pump-turbine units. This arrangement may provide several advantages. For example, drainage of one unit during operation with an appropriate reduction of prime mover power would enable the remaining cartridges to function in their normal manner. Alternatively, at least one of the units, such as turbine 524c together with its pumps 521e and 521f, might have its blading and fluid passages arranged so that it serves as a reversing turbine to be kept drained while the forward units are operating. When reversed operation is desired, the forward units can be quickly drained of fluid, and the reversing unit quickly filled, to provide reversed directional rotation of take-off shaft 25 without changing the direction of rotation of the pump impeller shafts 523, or that of the drive members 559. These drive members 559 may be comprised of two steam turbines of the cross-compound type. These drive members need not be identical and still they can be connected to properly selected pumps so that each drive member-pump set will deliver the same static pressure and flow velocity at the propeller drive turbine inlet to assure matching flows at that point. For instance, assume forty thousand (S.H.P.) cross-compound LP and HP drive members, one designed to rotate at 3,000 r.p.m. and the other at 1,000 r.p.m. and each designed to absorb 20,000 horsepower. Matched turbine inlet flow can be assured by selecting two different sized pumps and pump hubs.

Of course, the component parts of the apparatus, in all of the arrangements, might be encased in a cast housing, or other structure having the fluid duct form integrated therein. Further, it should be noted that all of the arrangements provide full, 360 degree perimeter, fluid entrance and exit from the turbine 24, thereby increasing turbine operating efficiency. The direction of flow of the fluid from the pumps to the turbine may be such as to balance the axial thrust during operation of the output shaft, or to balance pump axial thrust where several pumps are used, or to do both. This will be readily apparent from the drawings without further explanation. It is also apparent that, where axial thrust of the parts is balanced, the size of the trust bearings of the apparatus can be considerably reduced.

From the several arrangements of the apparatus as shown by FIGURES 1–5, it is apparent that a feature of the invention is its adaptability to many alternative arrangements and constructions. The availability of such a wide choice of arrangements in such apparatus should eliminate many problems presently confronting the power plant designer.

The cross-sectional configuration of all of the blading of the apparatus, including pump and turbine moving and stationary blades and stationary guide blades within the fluid passageways, is generally of reaction type blade shape, as opposed to impulse type blade configurations. In pressurized systems all blades have standard NACA sections of modifications thereof. In non-pressurized systems one alternate possibility for the pump is to use super-cavitating blade sections.

Pump impeller blading 22 is constructed having greater blade pitch variation along the length of the blade than the other blading of the apparatus. It is suggested that impeller blading 22 be composed of NACA Series 65 blade sections. It is preferred that the pump impeller blading have a high solidity of the order of 1.5 at the root and .7 at the tip for greatest efficiency.

The turbine blading preferably has a solidity of about 1.5 at each radius. This solidity is substantially constant from root to tip due to the large relative hub radius as compared to the blade radius.

It has been found that variation in the speed reduction ratio afforded by the apparatus can be brought about simply by altering the number of stages in the turbine 24, all other design characteristics remaining substantially the same. This is shown by the equation, in general form, for speed reduction ratios in hydraulic torque converter apparatus for the case where the pumps of the system are arranged in parallel relationship with respect to the direction of fluid output flows from each of them, which general form equation is:

(1) $$\frac{N_p}{N_t} = \left(\frac{D_t}{D_p}\right)\sqrt{n_t \cdot f_{(x)}}$$

where
$N_p$ = Pump speed in revolutions per second (r.p.s.),
$N_t$ = Turbine speed in r.p.s.,
$D_t$ = Diameter of turbine,
$D_p$ = Diameter of pump,
$n_t$ = Number of stages in the turbine, and
$f_{(x)}$ = A function of flow geometry
variable $x$, not relevant here.

The similar general form of the r.p.m. ratio equation for the case where the pumps are in series arrangement with respect to the direction of output flow from each of them (i.e., staged relationship) is:

(2) $$\frac{N_p}{N_t}\frac{D_t}{D_p}\sqrt{\frac{n_t}{n_p}} \cdot f_{(x)}$$

Comparison of equations 1 and 2 shows:

(3) $$\frac{(N_p/N_t)\ \text{Parallel}}{(N_p/N_t)\ \text{Series}} = \sqrt{n_p}$$

This shows that for the same quantities in equations 1 and 2 the r.p.m. reduction ratio of the parallel arrangement is greater than that of the series arrangement by the square root of the number of pumps. From Equation 1 it may be noted that the number of pumps, or pump stages is not a directly appearing factor, whereas the number of pumps or pumping stages is a factor in the similar general form of Equation 2 for the case where the pumps are in series arrangement with respect to the direction of output flow from each of them (i.e., staged relationship). Equation 2 shows that an increasing number of series arranged pumps will lessen the attainable r.p.m. reduction ratio, all other quantities in this equation are constant.

Thus, by Equation 1, as the number of turbine stages is increased, the speed reduction ratio of the system is also increased at a greater rate than the series arrangement of Equation 2. It can be shown that the parallel pump system allows greater freedom in the choice of turbine proportions than the series system and in many instances the parallel system leads to a useful design where the series case may not. Where the parallel system is installed in a ship, this means that addition of turbine stages will afford slower propeller speed independently of the speed of rotation of the pump ($N_p$), and of the respective diameters of the pump or turbine ($D_p$ or $D_t$).

It has also been found that parallel arrangement of turbines or turbine stages, with respect to the direction of fluid flow to each of them, multiplies the power transmission capacity of a given system. Thus, the "stacked," or "Cartridge" arrangement of pump-turbine combinations, as shown by FIGURE 5, wherein each unit combination recirculates its own fluid supply, may have advantages by multiplication of power capacity of the system as compared to the same general arrangement, but wherein the flow of fluid to all of the turbines, or stages thereof, is in series relationship.

Typical apparatus for installation in a primary speed reduction system for marine use is shown by FIGURE 1. In this arrangement, two 2-stage turbines 124a and 124b, each served by four pumps 121a–d and 121e–h, respectively, are used to transmit power with accompanying speed reduction from two power input, or pump impeller shafts 123 to the take-off shaft 125. Other essential component parts of the apparatus and their general arrangement will be readily understood from the reference numerals thereon by comparison with the above description and other figures of the drawings. However, two additional turbines 124c and 124d are shown connected to the take-off shaft reversing turbines. These turbines 124c and 124d will not be in operation, that is, interconnected by transmission fluid to the pumps 121a–d and 121e–h, respectively, while turbines 121a and 121b are in operation to rotate take-off shaft 125 in a forward rotational direction. Five ring type reversing valves 156 are provided on the turbine drum 129, each being mounted for sliding movement in the direction of the axis of rotation of the turbine drum, as shown. The valves 156 are coupled together by means (not shown) for concurrent movement of all of them, to their respective necessary positions to effect the reversal of rotation of take-off shaft 125, as will be described. These means will extend through and be operable from outside of the apparatus housing 141. Thus, each valve 156 may be moved along sleeve surface 157 of the turbine drum 129, the valves 156 sliding on surfaces 158 thereof. Each may be moved to be positioned against proximate turbine inlet openings or outlet openings, as the case may be, to effect a shunting of the fluid flow away from the inlet opening or outlet opening of a forward turbine to one or the other openings of a reversing turbine, and vice versa, as will be readily understood from a study of FIGURE 1. Thus, when the direction of rotation of the take-off shaft 125 is to be reversed, such is achieved independently of, and therefore without regard to, the direction of rotation of the pumps 121a–h and consequently that of the engine drive shafts (not shown) to which the pump impeller shafts 123 are connected.

FIGURE 6 suggests an arrangement of the system and apparatus of the invention whereby propulsion power from two steam turbines of a ship may be transmitted to two concentrically arranged propeller shafts 612a and 662b to drive two counter rotating propellers 663a and 663b thereof. The drive shafts 660 of turbines 659 are coupled by means 61 to impeller shafts 23 of the two pump sets 640a–b, each of which are schematically shown as a single pump but each of which may have a plurality of pumps (not shown) therein. Both pump sets 40a and 640b pump fluid through the turbine 41 from opposing sides thereof. This fluid drives the turbine impeller blades 642a, which are interconnected to the outer propeller shaft 662a by means of member 643a having spoke-like portions interconnecting the turbine drum and the outer shaft 662a in one direction and drives the blades 642b, which are interconnected to the inner propeller shaft 662b by means of member 643b, in the opposite direction. Alternate arrangements are obviously suggested by the arrangement shown. It is obvious that the turbine blading in each turbine unit 641a and 641b is mounted oppositely to that in the other so that the propellers 663a and 663b will rotate in opposite directions during movement of the ship.

In all arrangements of the system and apparatus when used as primary speed reduction means of a ship, the components of the apparatus will be small in size, weight and space requirements as compared to those factors in other drive systems. The various arrangements of the apparatus of the invention which become available causes the speed reduction system of the ship to be extremely compact as compared with other presently known systems. For instance, as presently designed, it is possible to utilize two pumps each absorbing 7500 S.H.P. at 6000 r.p.m. delivering to one turbine 15,000 S.H.P. at 200 r.p.m. with an overall length of the converter of about 8 feet with ahead and astern units and the lateral area of the converter contained within a width of about 5 feet. This converter has an efficiency greater than 82%. By careful design, including attention to the respective diameters of the pump and turbine components, to the number of pumps and the number of turbine stages to be served by one or more pumps, to the duct means, and to the arrangement of the parts of the system, all of which are subject to variation, speed reduction ratios above 80 to 1 can be relatively efficiently achieved.

Thus, a hydraulic speed reduction system and apparatus has been described which is useful for transmitting mechanical power from a relatively high speed drive member to a driven member intended to rotate at altered speed with respect to that of the drive member. Further-more, the system and apparatus achieves all of the objects of the invention. Of course, it is understood that those having skill in the art may modify the system and apparatus by means which are the equivalents of one or more of those provided. However such modifications would be within the scope of the appended claims.

What is claimed:

1. Hydraulic transmission apparatus employing a high mass flow of fluid for transmitting high power from a plurality of drive shafts each having a high rotational speed to a driven shaft having a comparatively low rotational speed, the drive shaft-to-driven shaft speed reduction ratio of the apparatus being in the range extending upwardly from the ratio of about four-to-one, said apparatus comprising a plurality of impeller shafts, each of said impeller shafts being adapted to engage a different one of said plurality of drive shafts, a plurality of comparatively high volume output type single stage axial flow pumps coupled to each of said impeller shafts, each of the pumps having a transmission fluid outlet opening, a plurality of turbines each being of the axial flow type having a fluid passage therethrough of substantially constant cross-section, each turbine of said plurality of turbines being adapted to engage said driven shaft and having a transmission fluid entrance opening in communication with substantially the complete periphery of said turbine to enable said turbine to be fully wetted by the flow of fluid therethrough, said fluid entrance opening of each of the turbines being comparatively spaced apart from said fluid outlet opening of each of the pumps, duct means extending between said fluid entrance opening of each of the turbines and said fluid outlet opening of a different one of the pumps of each of the impeller shafts to provide a passageway for transmission fluid for interconnecting the pumps and the turbines, and means for supplying said fluid to said pumps, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one, whereby the speed of rotation of said turbines and said driven shaft when said apparatus is transmitting high power is substantially less than that of said drive shaft.

2. A hydraulic transmission system employing a high mass flow of fluid for transmitting a high level of mechanical power from an engine drive shaft of high rotational speed to a power take-off shaft accompanied by substantial reduction of rotational speed, the drive shaft to take-off shaft speed reduction ratio of the system being in the range extending upwardly from about four-to-one, said system comprising a plurality of impeller shafts adapted to be connected to said engine drive shaft, a plurality of comparatively high volume output type single stage axial flow pumps coupled to each of said impeller shafts to be driven thereby, a turbine shaft adapted to be connected to said power take-off shaft, a plurality of turbines each having at least one row of moving reaction type blades mounted in a turbine wheel coupled for driving engagement with said turbine shaft and at least one row of stationary reaction type blades, each of said turbines having an entrance opening and an exit opening in communication with substantially the complete periphery of said turbine to enable said turbine to be fully wetted by the flow of fluid therethrough, and duct means forming an enclosed recirculating passageway for transmission fluid with respect to said entrance opening and said exit opening of each of said turbines and a different one of said pumps coupled to each of said impeller shafts, said duct means being adapted to contain transmission fluid within said passageway for interconnecting a different portion of said plurality of pumps to each of said turbines, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one, whereby upon rotation of said engine drive shaft said pumps continuously deliver comparatively high mass flow of said fluid at moderate flow head to said turbines causing their rotation and the rotation of said take-off shaft at a speed substantially less than that of the said engine drive shaft.

3. A hydraulic speed reduction system employing a high mass flow of fluid for transmitting a relatively high level of mechanical power from the rotating drive shafts of two relatively high speed main propulsion engines to the relatively low speed propeller shaft of a ship, the drive shaft-to-propeller shaft speed ratio of the system being in the range extending upwardly from the ratio of about four-to-one, said system comprising a first common impeller shaft adapted to be connected to one of said drive shafts, at least two axial flow blade type single stage pumps coupled to said first drive shaft, a second common impeller shaft adapted to be connected to the other of said drive shafts to be rotated thereby, at least two axial flow blade type single stage pumps arranged on said second common impeller shaft, each of said pumps having a transmission fluid inlet opening and an outlet opening, at least two axial flow reaction blade type turbines in driving engagement and axially aligned with said propeller shaft, each of said turbines having at least one stage and having a transmission fluid entrance opening and an exit opening each extending circumferentially in communication with substantially the complete perimeter thereof to enable said turbine to be fully wetted by the flow of fluid therethrough, said impeller shafts being aligned parallel to and disposed on opposite sides of the axis of rotation of said turbine, and duct means extending between said fluid outlet opening and inlet opening of each the pumps on each of said impeller shafts and respectively said entrance opening and exit opening of a different one of said turbines, said duct means providing an enclosed recirculating passageway for transmission fluid with said passageway interconnecting the pumps and the turbines, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one.

4. A hydraulic speed reduction system employing a high mass flow of fluid for transmitting a relatively high level of mechanical power from two rotating drive shafts driven by at least one relatively high speed main propulsion engine to the propeller shaft of a ship which is intended to rotate at relatively low speed, the drive shaft-to-propeller shaft speed ratio of the system being in the range extending upwardly from the ratio of about four-to-one, said system comprising at least a first impeller shaft adapted to be connected to one of said drive shafts, a plurality of first axial flow blade type single stage pumps coupled to said first impeller shaft to be driven thereby, each of said plurality of pumps having a transmission fluid inlet opening and outlet opening, a second impeller shaft adapted to be connected to the other of said drive shafts, another plurality of axial flow blade type single stage pumps coupled to said second impeller shaft to be driven thereby, each of said other plurality of pumps having a transmission fluid inlet opening and outlet opening, a turbine shaft adapted to be engaged to and in axial alignment with said propeller shaft, a plurality of turbines coupled to said turbine shaft, each of said turbines having at least one stage and having a transmission fluid entrance opening and an exit opening each extending circumferentially in communication with substantially the full perimeter of said turbine to enable said turbine to be fully wetted by the flow of fluid therethrough, said impeller shafts being aligned parallel to and disposed on opposite sides of the axis of rotation of said turbine, each of said pumps on each shaft being in paired relationship to a pump on the other shaft, and duct means extending between said fluid outlet openings and inlet openings of each of the pumps in paired relationship and respectively said entrance opening and exit opening of a different one of said plurality of turbines for providing enclosed recirculating passageways for transmission fluid when said transmission fluid is disposed within said passageways for interconnecting the pumps and the turbines, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one.

5. A speed reduction system employing a high mass flow of fluid comprising an output shaft adapted to be connected to a load, a plurality of axial flow turbines spaced apart from one another and coupled to said output shaft, each of said turbines having an entrance opening and an exit opening in communication with substantially the complete periphery of said turbine to enable each of said turbines to be fully wetted by the flow of fluid therethrough, a plurality of input shafts adapted to be connected to a prime mover operating at comparatively high speed and capable of providing a relatively high level of power, a plurality of axial flow pumps corresponding in number to that of said plurality of turbines connected to each of said input shafts, each of said pumps being spaced apart from one another, the input shaft-to-output shaft speed ratio of the system being in the range extending upwardly from the ratio of about four-to-one, means for forming a plurality of recirculating passages corresponding in numbers to that of said plurality of turbines, each of said passages being adapted to recirculate transmission liquid between a different one of said pumps on each of said input shafts and said entrance and exit openings of a different one of said turbines, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one, and means for selectively filling and emptying the transmission liquid with respect to a predetermined number of said plurality of recirculating passages, whereby a predetermined number of pumps and turbines can be activated.

6. A speed reduction system employing a high mass flow of fluid comprising an output shaft adapted to be connected to a load, a plurality of axial flow turbines spaced apart from one another and coupled to said output shaft, each of said turbines having an entrance opening and an exit opening in communication with substantially the complete periphery of said turbine to enable said turbine to be fully wetted by the flow of fluid therethrough, a plurality of shafts adapted to be connected to a prime mover operating at high rotational speed and capable of delivering high power, the input shaft-to-output shaft speed being in the range extending upwardly from the ratio of about four-to-one, a plurality of axial flow pumps corresponding in number to that of said plurality of turbines coupled to each of said input shafts, each of said pumps being spaced apart from one another, means for forming a plurality of recirculating passages corresponding in numbers to that of said plurality of turbines, each of said passages being adapted to recirculate fluid between a different one of said pumps and said entrance opening and said exit opening of a different one of the turbines, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one, at least one of said turbines and pumps in at least one of said recirculating passages being conditioned to cause said one turbine to rotate in a direction opposite to said predetermined direction of the other turbines in response to the flow of transmission liquid therethrough as said pumps rotate in said other predetermined direction, and means for selectively filling and emptying the transmission liquid with respect to said one recirculating passage and the other of said plurality of recirculating passages, whereby the direction of rotation of said output shaft can be selected.

7. A speed reduction system employing a high mass flow of fluid comprising an output shaft adapted to be connected to a load, a plurality of axial flow turbines spaced apart from one another and coupled to said output shaft, each of said turbines having an entrance opening and an exit opening in communication with substantially the complete periphery of said turbine to enable each of said turbines to be fully wetted by the flow of fluid therethrough, a plurality of input shafts adapted to be connected to a prime mover operating at high rotational speed and capable of providing a relatively high level of power, the input shaft-to-output shaft speed reduction ratio being in the range extending upwardly from the ratio of about four-to-one, a plurality of axial flow pumps corresponding in number to that of said plurality of turbines being coupled to each of said input shafts, each of said pumps coupled to each of said input shafts being spaced apart from one another and disposed adjacent to a different one of the said turbines, and means for forming a plurality of recirculating passages corresponding in numbers to that of said plurality of turbines, each of said passages being adapted to recirculate liquid between said entrance opening and said exit opening of a different one of said turbines and the pumps disposed adjacent thereto, the ratio of the speed of rotation of each of said pumps for providing a predetermined flow of fluid therethrough to the speed of rotation of said turbine interconnected therewith for receiving said predetermined flow therefrom being in the range extending upwardly from about four-to-one.

References Cited by the Examiner

UNITED STATES PATENTS

| 1,451,997 | 4/1923 | Michell | 60—54 |
| 1,965,518 | 8/1934 | Wilson | 60—54 |
| 2,110,741 | 3/1938 | Seibold | 60—54 |
| 2,179,520 | 11/1939 | Popper | 60—54 |
| 2,298,310 | 10/1942 | Ray | 60—54 |
| 2,357,654 | 9/1944 | Horton | 60—54 |
| 2,382,034 | 8/1945 | Wemp | 60—54 |

FOREIGN PATENTS 201,034  7/1923  Great Britain.

JULIUS E. WEST, *Primary Examiner.*